United States Patent [19]

Prior

[11] 4,336,134

[45] Jun. 22, 1982

[54] FLOAT-ACTUATED LEVEL CONTROL VALVE

[75] Inventor: William C. Prior, Newbury, Ohio

[73] Assignee: Kinetico, Inc., Newbury, Ohio

[21] Appl. No.: 146,217

[22] Filed: May 5, 1980

[51] Int. Cl.³ .............................................. C02B 1/22
[52] U.S. Cl. .................................... 210/127; 210/136;
        210/190; 210/222; 137/513.5; 137/514
[58] Field of Search .............. 210/104, 126, 127, 190,
        210/191, 222, 223, 139, 119, 136; 137/513.5,
                                                    514, 523

[56] References Cited

U.S. PATENT DOCUMENTS

| | | | |
|---|---|---|---|
| 3,163,394 | 12/1964 | Downin .............................. | 137/513.5 |
| 3,185,302 | 5/1965 | Kryzer ................................. | 210/126 |
| 3,326,377 | 6/1967 | Abos .................................... | 210/126 |
| 3,424,311 | 1/1969 | Siedenburg .......................... | 210/109 |
| 3,891,552 | 6/1975 | Prior ................................... | 210/190 X |
| 4,147,629 | 4/1979 | Geurtsen ............................ | 210/116 X |

Primary Examiner—John Adee
Attorney, Agent, or Firm—Watts, Hoffmann, Fisher & Heinke Co.

[57] ABSTRACT

A float-actuated, level control valve especially suited for controlling liquid flow into and out of brine tanks of water softening systems. A magnet-operated ball check inside a flow chamber selectively closes ports of the chamber to interrupt liquid flow. Movement of the magnet and operation of the ball check is controlled by a pair of floats so that the valve is opened and closed in response to changes of liquid level. The relative position of the floats can be adjusted to vary the amount of liquid drawn out of the tank, while maintaining a constant maximum level when the tank is filled.

12 Claims, 4 Drawing Figures

FLOAT-ACTUATED LEVEL CONTROL VALVE

BACKGROUND OF THE INVENTION

This invention relates generally to valves, and more specifically to a brine valve used in water softening systems.

A household water softener system typically includes a resin tank through which hard water passes to exchange its "hard" ions of calcium and magnesium for "soft" sodium ions. Regeneration of the resin bed is required periodically to replenish the supply of "soft" ions and to remove the accumulation of "hard" ions from the bed. The regeneration is effected by flushing a brine solution through the resin tank. A water softener of this type is more fully described in U.S. Pat. No. 3,891,552, issued June 24, 1975 to William C. Prior and James W. Kewley, entitled CONTROL VALVE FOR WATER SOFTENERS, the disclosure of which is incorporated herein by reference.

Modern water softeners of the type disclosed in U.S. Pat. No. 3,891,552 typically employ a brine tank which includes a reservoir and a supply of salt disposed at a level above the bottom of the reservoir. A tube connected to a source of water establishes a path for water to flow to the reservoir. Upon the attainment of a predetermined level in the reservoir, the water coacts with the salt supply to provide a source of brine for regeneration of the resin bed. When regeneration is required, the brine is aspirated through the same tube that supplied water to the reservoir. The amount of water introduced to the brine tank after a regeneration cycle and the amount of brine aspirated from the tank during a regeneration cycle is controlled by a brine valve mechanism.

One prior brine valve arrangement includes a float and a stem that extends downward from the center of the float into a valve housing through an apertured plate. The stem includes a rubber seal on each side of the plate. The rubber seals are adapted to abut either the upper, outer face of the plate or the lower, inner face of the plate to seal the plate apertures and close the valve mechanism. When brine is drawn from the tank through the apertures, the float lowers until the upper seal contacts the outer face of the plate to close the apertures and prevent any further outflow of brine. When fresh water is introduced into the brine tank, the float gradually rises until the lower seal closes the orifices.

This prior brine valve has two main disadvantages. One disadvantage is that the seals are easily fouled by dirt which can prevent the valve from closing. If this happens, the brine tank can overflow through the introduction of too much water causing possible damage to the surrounding area. The second main disadvantage is that the valve cannot be adjusted to change the amount of brine aspirated from the brine tank, while providing for a constant level of liquid when the tank is recharged with fresh water.

Another known brine valve is adjustable to vary the amount of brine drawn out of the brine tank of a water softener system commensurate with the rate of soft water use and the amount of brine needed to regenerate the resin bed. This conventional brine valve includes a stem extending upwardly from a valve housing and a float attached to the stem. The float and its associated stem are movable together in response to the level of brine in the tank to control the amount of liquid flow through the valve. The float can be slid along the stem to any selected position. By increasing the distance of the float from the housing, it is possible to increase the outflow of brine from the brine tank. The float position also controls the maximum level of water in the brine tank. The disadvantage is that the increased distance of the float from the housing results in more fresh water being introduced into the brine tank during replenishment of the supply of brine, so that more than a desired amount of the salt in the reservoir is submerged in water. The wet salt becomes mushy and tends to cake.

A need has existed for a brine valve capable of varying the amount of brine extracted from a brine tank of a water softener system without an attendant change in the highest level of brine in the reservoir. A need has also existed for a brine valve that is relatively free from malfunction and easy to assemble.

SUMMARY OF THE INVENTION

The present invention is an improved level control valve that meets the above needs and overcomes the disadvantages of prior art brine valves. In particular, the invention provides a new float-actuated, level control valve which can be adjusted to vary the outflow from a brine tank, while maintaining a constant level of liquid in the tank when it is recharged with fresh water.

In a preferred embodiment, the valve of the invention includes a chamber having spaced ports arranged to establish liquid flow through the chamber when the valve is open, a valve check in the chamber arranged to selectively open and close at least one port, thereby controlling liquid flow, a magnet that coacts with the valve check in one position to hold it away from the port and in another position to permit the valve check to seat and close the port, and a float connected to the magnet for moving it in response to changes of liquid level.

In an especially preferred embodiment, the valve check can close either of two ports to interrupt liquid flow through the chamber, and a movable stop is provided to interrupt movement of the magnet as the level of liquid drops in the brine tank. A second float is connected to the stop below the magnet float so that the stop is moved out of the way of the magnet after the brine falls to a pre-determined level. When fresh water is introduced through the valve into the tank, the second float raises the stop to the limit of its travel and then the first float continues to raise the magnet until it causes the valve check to seat and prevent additional water from flowing into the tank.

The unique construction of the new valve makes it possible to vary the amount of brine drawn out of the tank without changing the maximum level of water when the tank is refilled. The amount of brine drawn out of the tank is controlled by the lower float connected to the stop and can be increased simply by lowering the stop float. The maximum level of liquid in the tank is controlled by the upper magnet float, and therefore adjustments of the lower float position do not effect the maximum liquid level.

The preferred construction of the new valve in which the valve check is in the form of a ball that can seat to selectively close the chamber ports in response to movement of the float-actuated magnet operates relatively free of malfunction compared to prior art valves incorporating valve stems, rubber seals, small holes, etc. that can be fouled by dirt. Another important advantage is that the new valve is easily assembled and serviced.

Other advantages and a fuller understanding of the invention will be had from the following detailed description and the accompanying drawings.

DESCRIPTION OF THE PREFERRED EMBODIMENT

Figure 1:
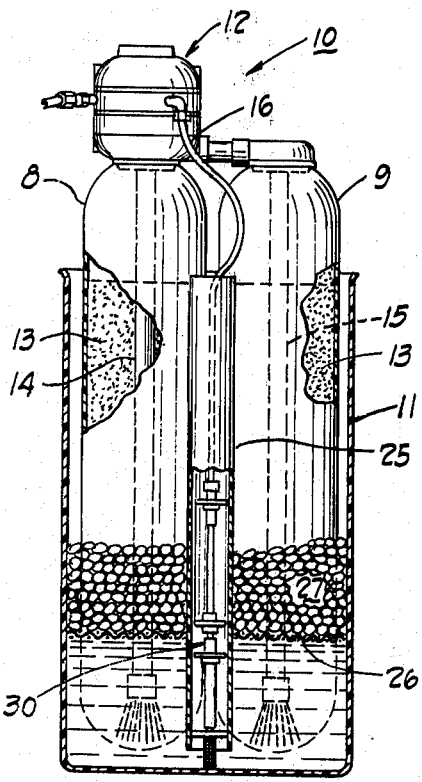
FIG. 1 is a view partly in section and partly in elevation of a water softener system employing a brine valve constructed in accordance with the present invention.

Referring to FIG. 1, a water softener 10 includes a pair of softener tanks 8, 9 positioned upright in an open-top brine tank 11. A valve assembly 12 is supported atop the tanks, 8, 9. The valve assembly 12 is programmed to selectively maintain one of the tanks 8, 9 on-line with a household water supply system. The off-line tank is subjected to a regeneration cycle and then held off-line until the on-line tank is exhausted. The frequency with which the valve assembly 12 switches the tanks 8, 9 from on-line operation to regeneration is controlled by monitoring the usage of softened water.

The softener tanks 8, 9 are of known configuration and contain suitable ion-exchange softening chemicals 13. The water softening process takes place as water passes through the tanks 8, 9. Hard water is channeled into the tanks and is softened during its passage downwardly through the chemicals 13. Softened water enters riser pipes 14, 15 depending centrally through the tanks 8, 9, respectively, and is directed back out of the tanks through the valve assembly 12.

During the regeneration cycle, brine from the tank 11 is admitted to the valve assembly 12 through a brine conduit 16. The brine supply system utilizes common ion replacement salts to regenerate the softening chemicals 13. As shown the brine tank 11 is an upstanding, open-top container formed from suitable metal or plastic. An upstanding brine well 25 in the brine tank is formed by an open-ended tubular member. A screen 26 extends horizontally from wall-to-wall in the brine tank 11 in regions around the softener tanks 8, 9 and around the brine well 25. The screen 26 is positioned above the bottom of the brine tank 11. Granular salt material 27 is deposited in the brine tank 11 on the screen 26. In an alternate arrangement to that shown, the brine tank may be located remote from the tanks 8, 9.

Figure 2:
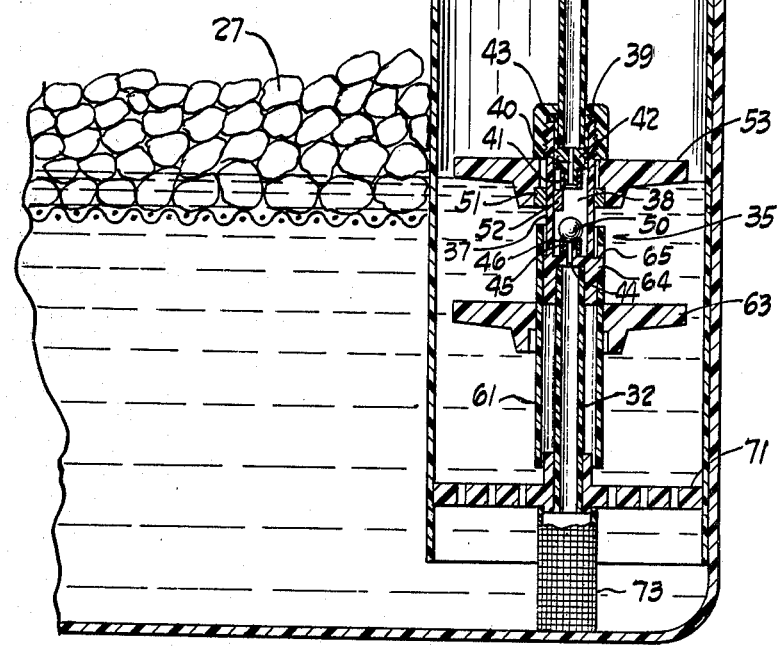
FIG. 2 is an enlarged cross-sectional view of the brine valve illustrated in FIG. 1.
Figure 4:
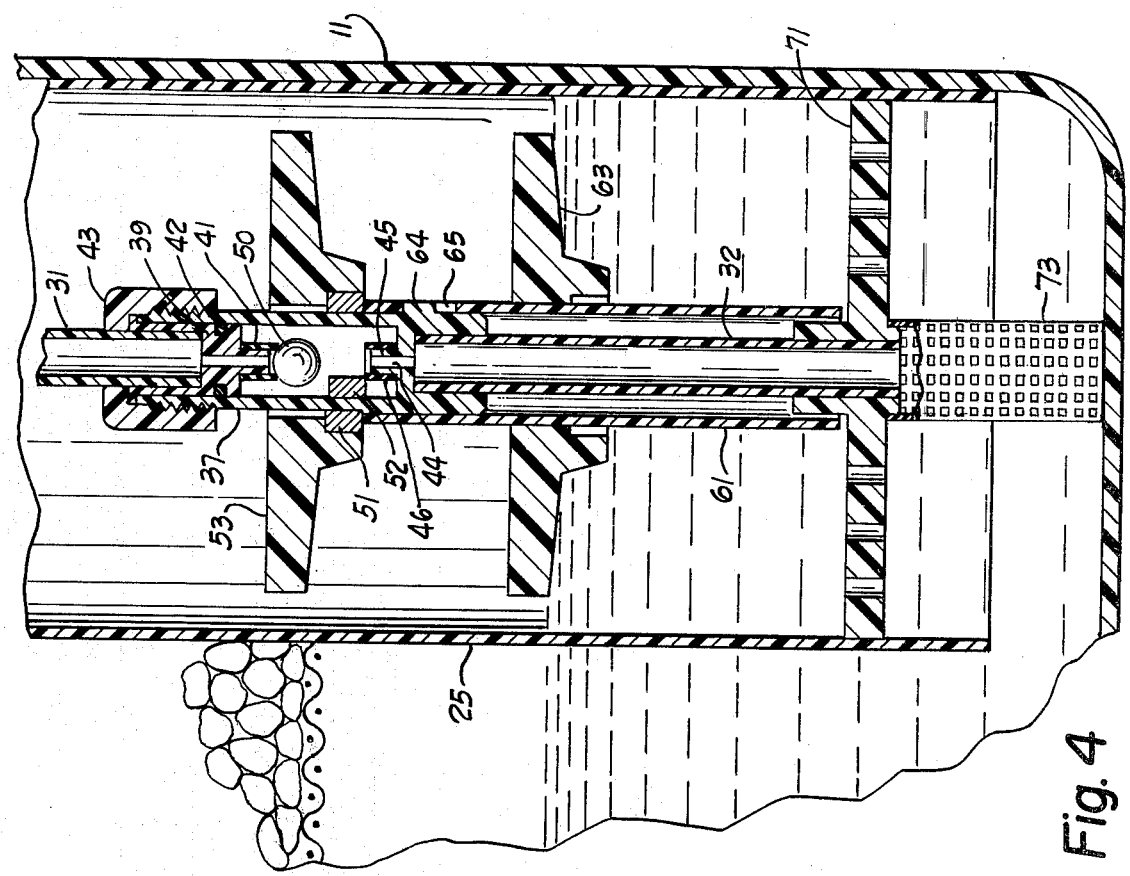
FIG. 4 is an enlarged fragmentary view of the valve showing the magnet in still another operative position.
Figure 3:
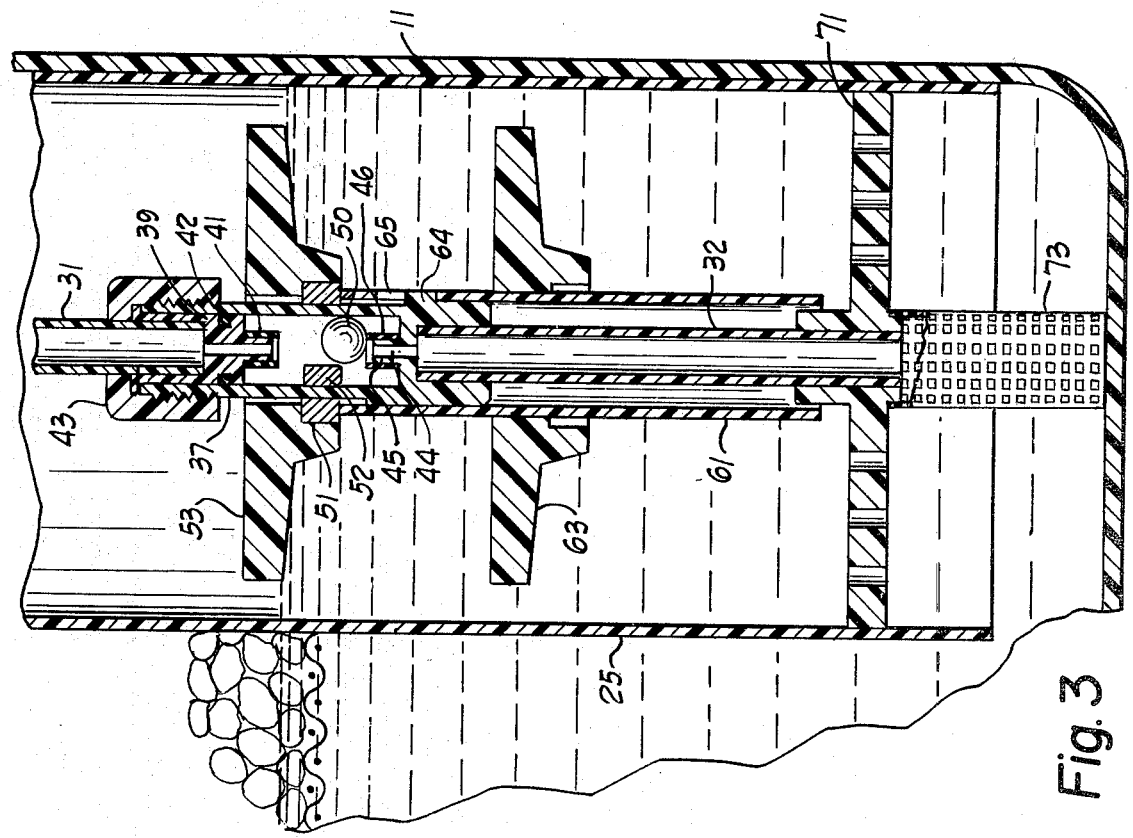
FIG. 3 is an enlarged fragmentary view of the valve showing the magnet in another operative position.

A brine valve assembly 30 located in the brine well 25 serves the dual functions of admitting a regulated amount of brine to the brine pipe 16 when the valve 12 establishes a suction in the brine pipe during the regeneration cycle, and of admitting a regulated amount of softened water to the brine tank from the brine pipe 16 at the end of the regeneration cycle. As best shown in FIGS. 2-4, the brine valve assembly 30 includes two pipes 31, 32 which form part of a stationary passage for liquid flow. The pipes 31, 32 are connected to each other through a flow regulator 35 and the pipe 31 is connected to the brine pipe 16 through a safety check mechanism 36.

The brine valve regulator 35 includes a tube 37 which defines a flow chamber 38. A tubular insert 39 fitted into the upper end of the tube 38 has a through passage 40 that forms a port into the chamber 38. The passage 40 is ported through a rubber seat 41 that is carried by the inner end of the insert 39. An O-ring 42 is provided between the tube 37 and the insert 39 to act as a fluid seal. The lower end of the pipe 31 is fitted into the upper end of the insert 39 through a collar 43 which is threaded onto the end of the tube 37 to hold the assembly together. The lower end of the tube 37 is fitted over the upper end of the pipe 32 and includes a central passage 44 that forms second port into the chamber 38 through a neck 45. A rubber valve seat 46 is engaged on the neck 45.

A valve check in the form of a ball 50 is provided in the chamber 38 to selectively close either of the ports 40, 44 by engagement on the seat 41 or 46. A magnet assembly comprising a ceramic magnet 51 outside the tube 37 and a ceramic magnet follower 52 inside the tube coacts with the ball check 50 to control selective closure of the ports 40, 44. The ceramic magnet 51 is a ring carried by a float 53 and is slidable axially of the tube 37 in response to changes of the liquid level in the brine well 25. The follower 52 follows the axial movement of the surrounding magnet 51. The member 52 may be a short segment which has a thickness sufficient to hold the ball check 50 off the seats 41, 46 when the follower engages the ball check.

The maximum level of liquid in the brine tank 11 is controlled by the upper position of the float 53 in which the ball check 50 is allowed to close the port 46. The amount of brine that can be drawn out of the tank 11 is controlled by a second float 60 which is fitted on a movable stop 61. The stop 61 comprises a tube which slides along the lower end of the tube 37 to control downward movement of the upper float 53 as the liquid goes down in the brine well 25. The range of vertical movement of the stop 61 is limited by a finger 64 that extends radially from the lower end of the tube 37 through a vertical slot 65 in the upper end of the stop 61.

The brine valve assembly 30 is spaced from the wall of the brine well 25 by a pair of circular plates 70, 71 which are engaged around the pipes 16, 32, respectively. An injection molded tubular screen element 73 is attached to the lower face of the plate 71 and its end resting on the bottom of the tank 11. The screen 73 serves as a filter and provides fluid communication between the tank 11 and the pipe 32.

FIG. 2 shows the positions of the floats 53, 63 and the ball check 50 when the tank is full. The float 53 is in the upper position where the follower 52 is raised out of contact with the ball check 50. The ball check 50 is engaged on the seat 46 to close the port 44. The float 63 is below the surface of the liquid in the brine well 25 and the stop 61 carried by the float is at its upper limit of travel.

When brine is aspirated from the tank 11, the ball check 50 is unseated to open the port 44 and permit the flow of brine up through the flow regulator 35. As the level of liquid falls in the brine well 25, the float 53 will move down to the position illustrated in FIG. 3 where the float and magnet 51 engage the upper end of the stop 61. In this intermediate position, the magnet follower 52 prevents the ball check 50 from seating to close the port 40.

The level of the brine in the well 25 can continue to fall without further movement of the float 53 until the brine level reaches the float 63. At this point, the float 63 will move down with the brine level to lower the stop 61 together with the magnet and float 51, 53. When the float 63 and the stop 61 reach the position shown in FIG. 4, the magnet follower 52 is out of contact with the ball check 50 so that it can close the upper port 40 to prevent further brine from being drawn through the flow regulator 35.

When fresh water is introduced through the pipes 16, 31 at the end of the regeneration cycle, the valve check 50 is prevented from closing the lower port 44 by the magnet follower 52 so that the water can flow through the regulator 35 into the tank 11. As the level of liquid in the brine well 25 goes up, the float 63 raises the stop 61 together with the magnet and float 51, 53 to the intermediate position illustrated in FIG. 3. In this position the ball check 50 is still prevented from seating to close the port 44 by the magnet follower 52. As the level of liquid in the brine well 25 continues to go up, the float 53 is raised from the position illustrated in FIG. 3 to that illustrated in FIG. 2. In the latter position, the magnet follower 52 is again out of contact with the ball check 50 so that it is permitted to close the port 44 to prevent the further introduction of water.

The lower float 63 which is fitted on the tubular stop 61 can be easily adjusted axially of the stop to change the amount of brine that is drawn out of the brine well 25. The amount of aspirated brine can be increased by moving the float 63 toward the lower end of the stop 61. When this is done, the float 63 will not move from the position shown in FIG. 3 to that of FIG. 4 until the level of brine in the well drops to the new lower position of the float. At the same time, the maximum level of liquid in the brine tank 11 which is controlled by the float 53 remains unchanged.

In the preferred embodiment, the safety check 36 of the brine valve assembly 30 prevents the brine tank 11 from overflowing in case the flow regulator 35 is damaged or malfunctions. The illustrated safety check 36 is similar to the regulator 35 and includes a tube 80 which defines a flow chamber 81. An insert 82 in the upper end of the tube 80 receives the lower end of the brine pipe 16. The insert 82 has a through passage 83 that forms a port into the chamber 81 through a tubular neck 84. The neck 84 is formed with circumferentially spaced, longitudinally extending slots 85. A collar 86 is threaded onto the upper end of the tube 80. The lower end of the tubular member 80 is fitted over the upper end of the pipe 31 and has a through passage 88 that forms a second port seat into the chamber 81. A rubber valve seat 87 is provided on the central portion of the member 80 around the inner ported end of the passage 88. A ball check 90 inside the chamber 81 is adapted to selectively close the port 88, as will be more fully described.

A magnet assembly consisting of an outer ring-shaped magnet 95 and a follower 96 inside the chamber 81 coacts with the ball check 90 to control its movement. The magnet 95 is carried by a float 97.

During normal operation of the brine valve regulator mechanism 35, the float 97 and the ball check 90 are in the positions illustrated in FIG. 2. As there shown, the float 97 is in a lowered position where the magnet 96 engages an abutment 98 on the tube 80. In the lowered position the magnet follower 96 holds the ball check 90 off the seat 87. In the event that the flow regulator 35 malfunctions or is damaged so that the ball check 50 does not close the passage 40, the water will rise in the brine well 25 until the liquid reaches the float 97. The float 97 is then raised until the magnet follower 96 is out of contact with the ball 90, permitting it to seat to close the port 88 and prevent the further introduction of water into the brine tank 11 through the safety check 36.

It will be seen from the foregoing that the invention provides a simplified brine valve mechanism having an operating member in the form of a ball check that is not subject to be fouled by dirt, etc. It will also be seen that the invention has achieved the objective of providing a brine valve that can be adjusted to vary the amount of brine that is drawn out of the brine tank during the regeneration cycle, while maintaining a constant maximum level of liquid in the tank when it is recharged with fresh water.

Many modifications and variations of the invention will be apparent to those skilled in the art in light of the foregoing detailed disclosure. Therefore, it is to be understood that, within the scope of the appended claims, the invention can be practiced otherwise than as specifically shown and described.

I claim:

1. A float-actuated liquid level control valve comprising:
   (a) means forming a chamber having spaced apart ports that can establish liquid flow through said chamber,
   (b) valve check means in said chamber adapted to establish one-way flow into said chamber through at least one port,
   (c) magnet means coacting with said valve check means in one position to prevent said valve check means from closing said one port against liquid flow out of said chamber, and
   (d) float means for moving said magnet means in response to changes of liquid level,
   (e) said magnet means including a magnet connected to said float means outside of said chamber and a magnet follower movable inside of said chamber with said magnet.

2. A float-actuated level control valve comprising:
   (a) a flow chamber having spaced ports,
   (b) a valve check movable in said chamber to establish one-way flow through said ports into said chamber,
   (c) a magnet outside of said chamber and a magnet follower inside said chamber,
   (d) said magnet follower being actuatable to different positions by movement of said magnet in order to prevent said valve check from closing a selected port, and
   (e) float means for causing movement of said magnet in response to changes of liquid level.

3. A float-actuated level control valve comprising:
   (a) a flow chamber having first and second ports,
   (b) valve check means in said chamber cooperable with either of said ports to establish one-way flow into said chamber,
   (c) valve operating means including a float and magnet movable outside of said chamber, and
   (d) a magnet follower inside said chamber movable in response to movement of said magnet between:
       (i) a first position in which said valve check means establishes one-way flow into said chamber through said first port and is prevented from closing said second port, whereby liquid can flow into said chamber via said first port and out of said chamber via said second port, and
       (ii) a second position in which said valve check means establishes one-way flow into said chamber through said second port and is prevented from closing said first port, where-by liquid can flow into said chamber via said second port and out of said chamber via said first port.

4. A valve as claimed in claim 3 including float-actuated stop means arranged outside said chamber to coact with said valve operating means, whereby said valve operating means is prevented from moving said follower to said second position until said stop means is actuated by a drop in liquid level.

5. A valve as claimed in claim 3 or claim 4 wherein said valve check means comprise a ball check, and wherein said chamber includes a seat for said ball check around said ports.

6. A float-actuated level control valve comprising:
(a) a flow chamber having first and second ports,
(b) a valve check cooperable with each port to establish one-way flow into said chamber and to block flow out of said chamber,
(c) a valve check operator including a first float and a magnet disposed outside of said chamber, said float and magnet being movable in response to a change in liquid level,
(d) a magnet follower movable inside said chamber in response to movement of said magnet,
(e) said follower coacting with said valve check in a first position to prevent said check from closing said first port against liquid flow out of said chamber and in a second position to prevent said check from closing said second port against liquid flow out of said chamber, and
(f) stop means including a second float positioned outside of said chamber so that said second float can be placed below said first float,
(g) said stop means being operatively engageable with said valve operator in one position to prevent it from moving said follower to said second position and being movable in response to a predetermined drop in liquid level, whereby said operator can move said follower to said second position.

7. A valve as claimed in claim 6 wherein the spacing between said floats can be adjustably varied.

8. In a water conditioning system including a water conditioning tank, a brine tank, a control valve connected to said conditioning tank, and a brine valve mechanism which controls the supply of brine to said conditioning tank during a regeneration cycle and the supply of water to said brine tank at the end of the regeneration cycle, characterized by a brine valve mechanism comprising:
(a) means forming a flow chamber for the brine and water, said chamber having:
 (i) a first port that serves as a water inlet and a brine outlet,
 (ii) a second port that serves as a brine inlet and a water outlet, (b) valve check means movable in said chamber to selectively close said ports and block liquid flow through said chamber,
(c) a valve check operator including a first float and a magnet disposed in said brine tank outside said flow chamber, said magnet being movable by said first float in response to change of liquid level in said brine tank, and
(d) a magnet follower in said flow chamber movable in response to movement of said magnet between:
 (i) a first position in which said follower prevents said valve check means from closing said first port to block the outlet flow of brine,
 (ii) a second position in which said follower prevents said valve check means from closing said second port to block the outlet flow of water.

9. The improvement of claim 8 wherein said brine valve mechanism is further characterized by movable stop means including a second float disposed at a lower level in said brine tank than said first float, said stop means being:
 (i) engageable with said valve operator in an arrest position to stop its movement before said follower has been actuated to said second position by a drop of liquid level in said brine tank,
 (ii) movable away from said arrest position after a drop of liquid level from said first float to said second float.

10. A float-actuated liquid level control valve comprising:
(a) means forming a chamber having ports spaced along an axis of said chamber,
(b) a float mounted outside of said chamber,
(c) a magnet outside of said chamber connected to said float for movement along said chamber axis to different valve operating positions in response to changes of liquid level, and
(d) means in said chamber operable to follow movement of said magnet and to selectively open and close said ports as said magnet is moved to different valve operating positions by said float.

11. A valve as claimed in claim 10 in which said means in said chamber comprises a magnet follower and a port closure member.

12. A valve as claimed in claim 11 in which said magnet follower is movable by said magnet to:
 (i) a first position in which said port closure member can establish one-way liquid flow into said chamber through a first port and is blocked by said magnet follower from closing a second port, whereby liquid can flow into said chamber via said first port and out of said chamber via said second port, and
 (ii) a second position in which said port closure member can establish one-way liquid flow into said chamber through said second port and is blocked by said magnet follower from closing said first port, whereby liquid can flow into said chamber via said second port and out of said chamber via said first port.

* * * * *